Figure 1:
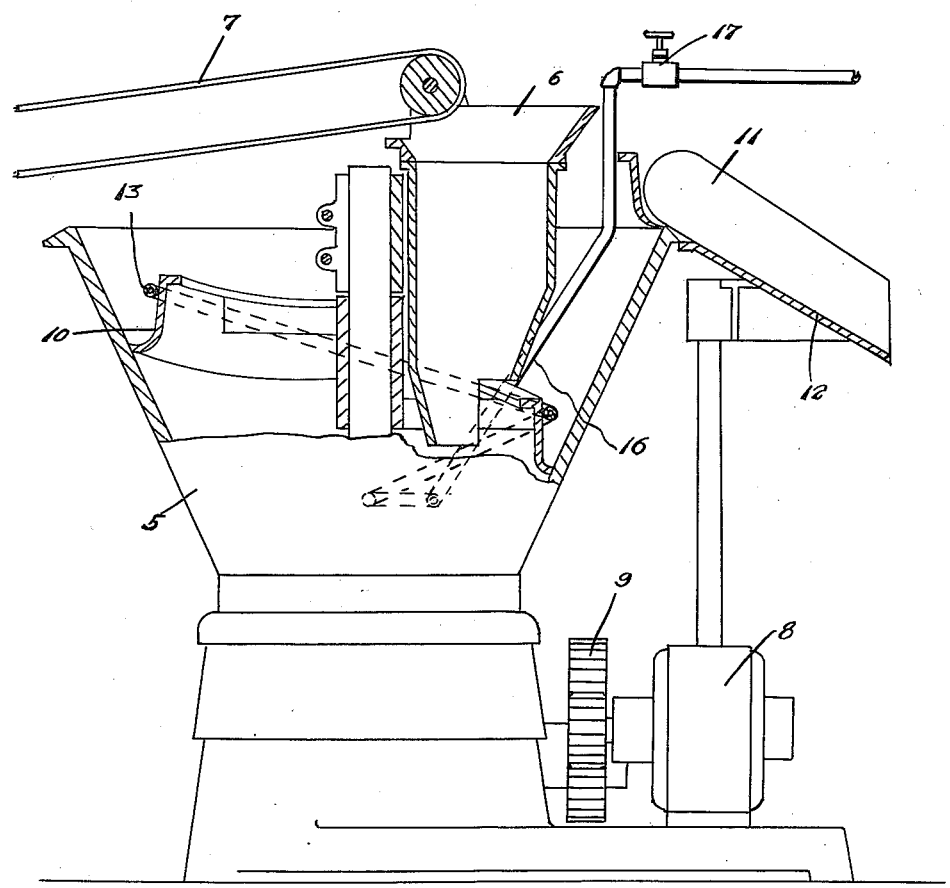

June 10, 1941.  W. LOCKWOOD  2,245,284
DOUGH HANDLING MACHINE
Filed Oct. 8, 1940  3 Sheets-Sheet 1

Inventor
Wilbur Lockwood
By Clarence A. O'Brien
Attorney

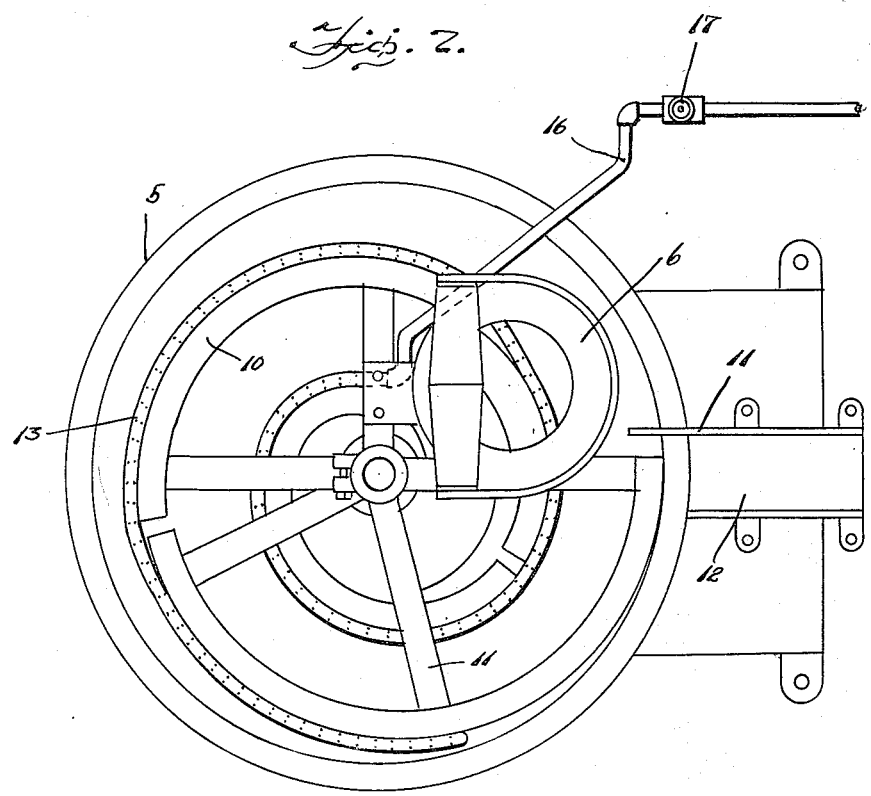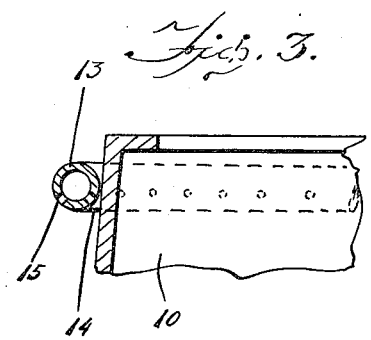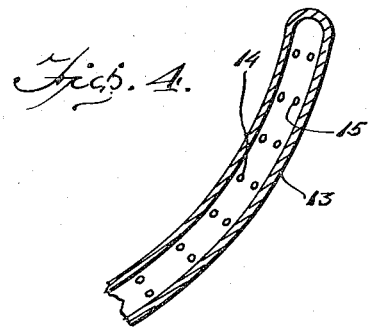

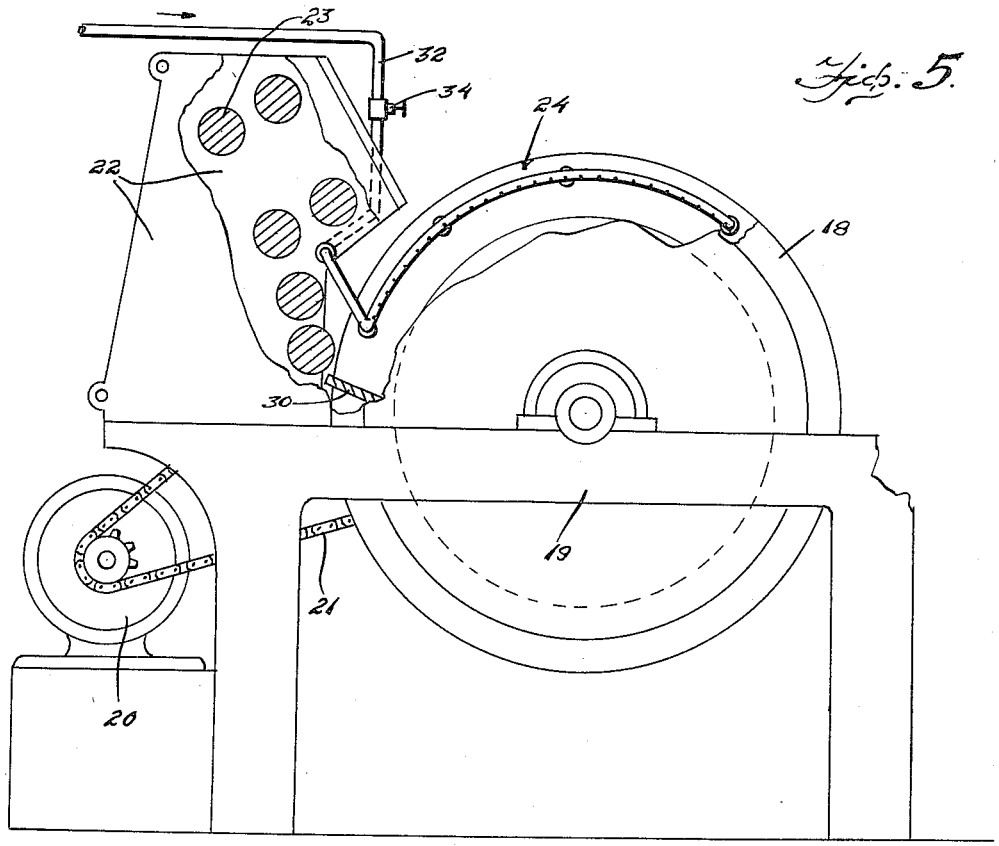
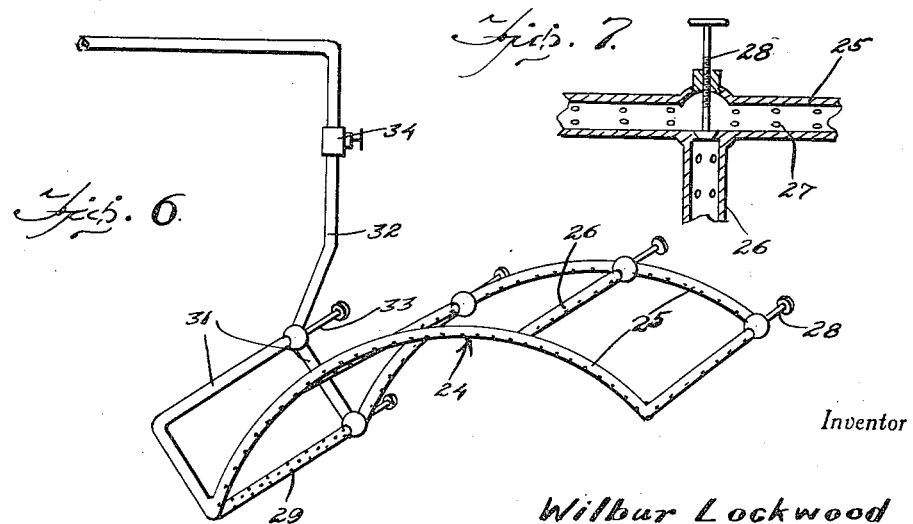

Patented June 10, 1941

2,245,284

UNITED STATES PATENT OFFICE 2,245,284

DOUGH HANDLING MACHINE

Wilbur Lockwood, Indianapolis, Ind.

Application October 8, 1940, Serial No. 360,335

5 Claims. (Cl. 107—9)

The present invention relates to new and useful improvements in dough machines of a type employed in shaping the dough into the desired form prior to baking, and the invention has for its primary object to provide a compressed air attachment for subjecting the surfaces of the machine to the air to prevent the sticking of the dough thereto.

In dough handling machines of this character it is a common practice to employ the use of a dusting flour to the parts of the machine with which the dough comes in contact for the purpose of preventing the sticking of the dough to the machine and accordingly, it is an object of the present invention to eliminate the necessity of employing such dusting flour and to provide the more economical expedient of utilizing air under pressure which maintains the surfaces of the machine in a dry condition and thereby prevent sticking of the dough thereto.

A further object of the present invention is to provide an attachment of this character of simple and practical construction which is efficient and reliable in performance, relatively inexpensive to install and maintain in operation and otherwise adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1 is a side elevational view with parts broken away and shown in section, of a conventional form of dough rounding machine showing my invention in position attached thereto, Figure 2 is a top plan view, Figure 3 is a fragmentary sectional view of one of the trough sections of the machine showing the perforated compressed air pipe supported adjacent thereto, Figure 4 is a fragmentary longitudinal sectional view through one of the perforated compressed air pipes, Figure 5 is a side elevational view, with parts broken away and shown in section, of a dough molder illustrating the manner of adapting the present invention thereto, Figure 6 is a perspective view of the pipe frame for supplying the compressed air to the molder, and Figure 7 is a fragmentary sectional view through the pipe frame showing one of the control valves therefor.

Referring now to the drawings in detail, and with particular reference to Figures 1 to 4 inclusive, the numerals 5 designate the rotary bowl of the rounding machine of conventional construction, the bowl being of substantially conical shape and provided with the feed hopper 6 in its upper portion into which the dough is fed from the conveyor 7. The electric motor for driving the bowl is shown at 8 and connected thereto by the gears 9.

Positioned on the inside of the bowl is the sectional trough shown at 10 which is secured against rotation by the frame members 11.

In the operation of a machine of this character the dough or other plastic material in rough lumps is placed upon the conveyor 7 which latter directs the lumps downwardly into the hopper 6 and into the bottom portion of the rotating bowl 5. The cooperative action of the rotating bowl and the stationary trough members not only causes the lump of dough to travel spirally upwardly through the trough, but also causes the lump of dough to rotate on an axis, thereby rounding up or giving shape to the lump of dough. When the shaped lump of dough reaches the top of the trough it comes into contact with the abutment shown at 11 and is deflected into the discharge chute 12 whereby it is directed away from the machine.

In order to prevent the sticking of the dough to the sides of the bowl 5 and the trough 10 I provide a perforated pipe 13 which is secured to the inside of the trough members 10, the pipe being likewise of substantially spiral form and provided with the rows of perforations 14 and 15 adapted to direct air under pressure against the surfaces of the trough 10 as well as against the sides of the bowl 5. The lower end of the pipe 13 is connected to a feed pipe 16 having a control valve 17 therein and leading to a suitable source of supply of air under pressure.

In Figures 5 to 7 inclusive I have illustrated the invention adapted for use upon a dough molder of conventional construction and which includes the revoluble drum 18 supported on the stand 19 and driven by the motor 20 by the chain drive 21. The dough is fed to the drum by way of the spaced rollers 23 journalled in the spaced supports 22.

The compressed air feed pipe is in the form of a frame shown generally at 24 which includes the spaced parallel arcuate frame members 25 which are secured in position adjacent the sides of the drum at the upper portion thereof as shown to advantage in Figure 5 of the drawings.

The arcuate frame members are connected at spaced intervals by transversely extending pipes 26, both the arcuate members and the transverse pipes being provided with the perforations 27 adapted to direct air under pressure downwardly against the surfaces of the drum and also against the inner side walls thereof.

At the junction of each of the transverse pipes 26 with the arcuate pipe 25 I provide a control valve 28 to control the quantity of air admitted to the transverse pipes.

As shown in Figure 6 of the drawings the transverse pipe immediately adjacent the rollers 23 may be provided with a plurality of rows of the perforations 29 to direct the air against the shelf 30 at the entrance to the molder and also to direct the air inwardly of the drum.

Each of the arcuate perforated pipes 25 are provided with individual compressed air feed pipes 31 to which the air under pressure is supplied by a common feed pipe 32 leading to a suitable source of supply, and at the junction of the pipes 31 with the pipe 32 is a control valve 33 for regulating the amount of air supplied to the respective arcuate pipes 25. The feed pipe 32 is also provided with a cut-off valve 34.

From the foregoing it will be apparent that the parts of the dough handling machine with which the dough comes in contact is supplied with air under pressure which serves to keep such parts of the machine dry and thus prevent sticking of the dough thereto.

While I have illustrated the invention applied to two types of dough handling machines it will be understood that the invention is equally well adapted for attaching to other types of machines.

Having thus described the invention, what I claim is—

1. A dough handling machine including a moving part and a stationary part and means for subjecting the parts with which the dough comes into contact with a force of air adapted to dry such parts to prevent sticking of the dough thereto.

2. A dough handling machine including a moving part and a stationary part and a perforated air feed pipe secured to said stationary part and adapted to subject the parts of the machine with which the dough comes into contact with a force of air for drying such parts to prevent sticking of the dough thereto.

3. A dough handling machine including a rotating bowl and a stationary spiral trough therein cooperating with each other to shape the dough placed in the machine and a perforated air feed pipe secured to the inner surface of the trough and adapted to subject said surface of the trough and the adjacent surface of the bowl to a force of air for drying the said surfaces to prevent sticking of the dough thereto.

4. A dough handling machine including a rotating drum and walls at each side of the drum, perforated air feed pipes on the inner surfaces of said walls and transverse perforated air feed pipes connecting the first named pipes and cooperating to subject the periphery of the drum and the inner surfaces of the walls to a force of air for drying the same to prevent sticking of the dough thereto.

5. A dough handling machine including a rotating drum and walls at each side of the drum, perforated air feed pipes on the inner surfaces of said walls and transverse perforated air feed pipes connecting the first named pipes and cooperating to subject the periphery of the drum and the inner surfaces of the walls to a force of air for drying the same to prevent sticking of the dough thereto and control valves for said first named pipes and for each of the transverse pipes.

WILBUR LOCKWOOD.